United States Patent [19]

Wilman et al.

[11] Patent Number: 4,586,090
[45] Date of Patent: Apr. 29, 1986

[54] DOCUMENT SCANNERS

[76] Inventors: Hugh Wilman, 76 Mount Grace Road, Potters Bar, Hertfordshire; James Brotton, 1 Moss Drive, Haslingfield, Cambridgeshire, both of England

[21] Appl. No.: 549,196

[22] Filed: Nov. 4, 1983

[30] Foreign Application Priority Data

Nov. 5, 1983 [GB] United Kingdom ................. 8231678

[51] Int. Cl.$^4$ ........................ H04N 1/64; H04N 1/387
[52] U.S. Cl. .................................... 358/285; 358/227; 358/294; 354/409; 354/195.13; 340/753; 355/55
[58] Field of Search ............... 358/285, 293, 294, 227; 355/55, 56, 59; 354/195.1, 195.13, 400, 409; 340/753

[56] References Cited

U.S. PATENT DOCUMENTS

| | | | |
|---|---|---|---|
| 3,796,951 | 3/1974 | Joseph | 340/753 |
| 3,945,023 | 3/1976 | Stauffer | 355/56 |
| 4,183,021 | 1/1980 | Gerstner | 340/753 |
| 4,264,160 | 4/1981 | Aoki | 354/409 |
| 4,319,238 | 3/1982 | Ogasawara et al. | 354/195.13 |
| 4,348,666 | 9/1982 | Ogita | 340/753 |
| 4,383,274 | 5/1983 | Imuiya | 355/56 |
| 4,473,287 | 9/1984 | Fukuhara et al. | 354/409 |

Primary Examiner—Howard W. Britton
Assistant Examiner—John K. Peng
Attorney, Agent, or Firm—Gifford, Groh, VanOphem, Sheridan, Sprinkle & Dolgorukov

[57] ABSTRACT

A device as described for indicating the state of focus of an image of a document which is converted into a video signal by sequentially inspecting the incident light level at points within the image and generating an electrical signal having a parameter which varies with the light level. The device includes:

(a) circuit responsive to the electrical signal from sequential inspection of the image for integrating the amplitude variations thereof to produce a varying amplitude focus indication signal,
(b) amplifying means for generating from the varying amplitude signal a varying control signal,
(c) an indicator comprising a linear array of lamps,
(d) circuit which provides operating current for the lamps the current being related to the amplitude of the focus indication signal, so that with increasing amplitude of the latter more of the lamps are caused to be illuminated or vice versa, where all the lamps are illuminated to indicate a state of poor focus, and
(e) means for ajusting the focus of the image in response to visual inspection of the illuminated lamps, so as to obtain the best possible indication of the state of focus of the image.

7 Claims, 5 Drawing Figures

DOCUMENT SCANNERS

DESCRIPTION

Field of Invention

This invention concerns document scanners and in particular a device for indicating the focus of the image of a document to be scanned.

BACKGROUND TO THE INVENTION

Where an image of a document is to be converted into an electrical video signal which in turn is to be formed into a digital signal for storage purposes, it is important that the image which is to be scanned and converted into the signal is itself in sharp focus. Failure to ensure this will mean an inferior conversion and inferior video signal and inaccurate digital signal. In turn this will result in an inferior if not useless reproduction of the original document upon reconstruction of the video signal in a television display.

SUMMARY OF THE INVENTION

According to the present invention a device for indicating the state of focus of an image of a document which is converted into a video signal by sequentially inspecting the incident light level at points within the image and generating an electrical signal having a parameter which varies with the light level, comprises:

(a) circuit means responsive to the electrical signal from the linear array for integrating the amplitude variations thereof to produce a varying amplitude focus indication signal, (b) amplifying means for generating from the varying amplitude signal a varying control signal, (c) an indicator comprising a linear array of lamps, (d) circuit means which provides operating current for the lamps the current being related to the amplitude of the focus indication signal, so that with increasing amplitude of the latter either more or less of the lamps are caused to be illuminated and vice versa, and (e) means for adjusting the focus of the image in response to visual inspection of the illuminated lamps.

In operation the focus adjusting means is altered until the number of lamps which are illuminated is the maximum (or minimum) for the document concerned whereupon the image can be assumed to be optimally in focus in the plane containing the linear array of photoconductors which are scanned to produce the video signal.

Conveniently alarm means may be provided together with circuit means associated therewith for indicating if the focus signal amplitude drops below a given value, during the scanning of the image.

Preferably the lamps are light emitting diodes (LED's) and comprise a so called LED strip indicator.

Preferably the integration of the video signal by the first mentioned circuit means is over each line scan of the image so that the focus indicator signal will respond quickly to any change in focus in the image.

BRIEF DESCRIPTION OF THE DRAWINGS

The invention will now be described by way of example with reference to the accompanying drawings in which.

DETAILED DESCRIPTION OF A PREFERRED EMBODIMENT

Figure 1:
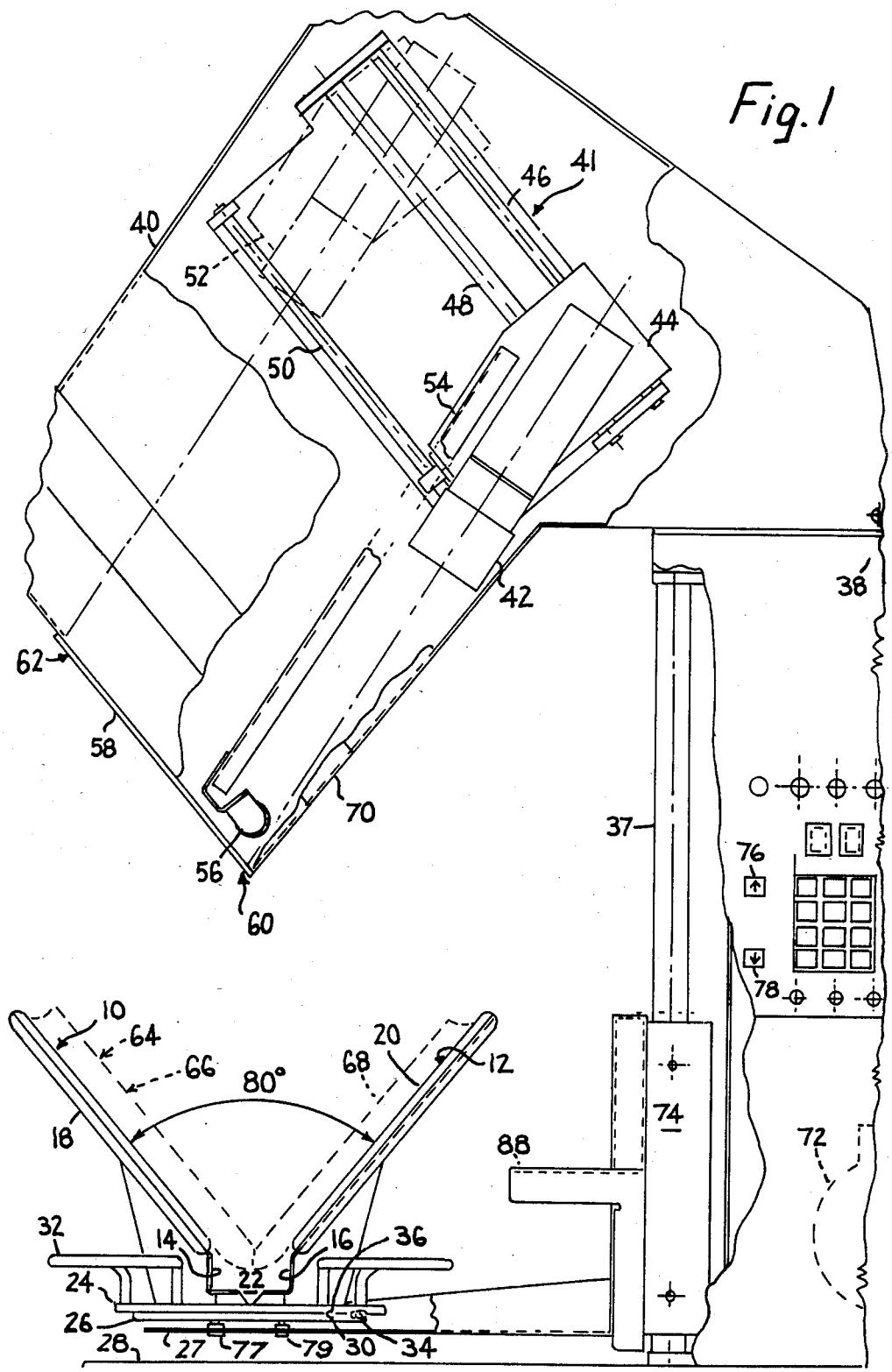
FIG. 1 is a side elevation from the front of a document scanner constructed in accordance with the invention.

FIG. 1 illustrates in side elevation a complete document scanner unit which includes a book support which is the subject of a copending application. The support comprises a pair of diverging plates generally designated 10 and 12 each comprising a metal inner member 14 and 16 and an outer coating of plastics material 18 and 20 respectively.

The two metal struts 14 and 16 are joined in a channel arrangement at 22 which itself is attached to an upper ring 24 of a bearing assembly having a lower ring 26 which is secured to a lifting base 27 (to be described in more detail hereinafter) mounted on a lower final base 28.

A ball-race 34 allows for rotation of the upper ring 24 relative to the lower ring 26 and a hand grip 32 extends around the upper ring to allow for manual rotation of the ring and support assembly.

A springloaded ball 30 and corresponding depressions such as 36 in the underside of the upper ring 24 provide stops to define at least two preferred angular positions separated by 180° of rotation of the ring 24. The base 28 serves as a support for a column 37 and associated housing 38 which houses controls and drives as required. At the upper end the column provides a support for a housing 40 within which is located a detector 42 such as a Fairchild camera type CCD 1500. The latter is mounted rigidly on a platform 44 the underside of which slideably engages a guide rail 46 and includes a driving collar threadedly engaged on a screw threaded rod 48. Rotation of the collar produces lateral movement of the platform 44 parallel to the guide rail 46.

A further guide rail at 50 prevents any torsional movement of the platform.

A drive means (not shown) such as an electric motor is provided on the underside of the platform 44 to drive the latter from one end of its traverse to theother.

The position of the platform 44 at the opposite end of its traverse is shown in dotted outline at 52.

Protruding from the platform is an arm 54 which is shown broken in order to reduce hidden detail to the minimum. The lower end of the arm 54 carries a strip light 56 and electrical connection to the strip light is achieved through a flexible cable (not shown).

As the platform 44 moves along its rails, so the light 56 travels by the same lateral distance.

The light 56 is positioned just behind a window 58 in the lower end of the housing 40 and the camera/detector 42 views a narrow strip which extends perpendicular to the direction of travel of the platform 44. With movement of the platform 44 from one end to the other of the rails 46 and 50, the viewing strip moves laterally from the end 60 to the end 62 of the window 58 and in the reverse direction back again from 62 to 60.

The camera/detector comprises a linear array of photoconductive junctions (charge coupled devices) and an appropriate lens (all not shown) so that a document positioned just to the left-hand side of the window shown in FIG. 1 will be in focus in a plane containing the line of photoconductive junctions. A document surface bearing against the underside of the window 58 will thus be brought to focus on the linear array of photoconductive junctions.

An electrical scanning circuit scans the junctions in succession so as to produce a series of electrical pulses corresponding to the illumination falling on the junctions along the linear array. By synchronizing the movement of the detector 42 and the rate of movement along the rails 46 and 50, the output signal will approximate a video signal similar to that obtained by rectilinear line scanning.

A book is shown in dotted outline at 64, opened and resting on the two inclined diverging supports 10 and 12. The upwardly facing surface of the left hand open page 66 will be viewed by the scanner 42 through the window 58 and a video signal of the page concerned can be obtained by scanning in the manner previously described.

By rotating the platform ring 24 through 180°, the opposite facing page 68 will be presented to the window 58 and can be scanned and converted into a video signal in a similar manner.

In order to present the appropriate page of the book to the window 58, the support assembly carried by the lifting platform 27 can be elevated until the pages of the book are in contact with the window 58 and the underside of the housing 70. To this end an electric motor drive shown in dotted outline at 72 is provided in the housing 38 and the lifting platform 27 is attached to a sleeve 74 carried by the column 37 which is driveable up and down the column by means of the electric motor 72 typically via the gearbox and clutch mechanism.

Up and down controls at 76 and 78 respectively are provided for appropriate rotation of the electric motor 72.

A stop mechanism (not shown) is provided which detects when the book is just below the housing 40 with the book still out of contact with the window 58 and underside 70 of the housing 40. At this position the motor 72 is stopped automatically and a form of manual control is provided to allow the book to be offered up into contact with the housing 40 under hand control. Although not shown, some form of ratchet or clutch mechanism is provided which allows the assembly carried by the lifting platform 27 to be moved in an upward direction without fall-back occurring and a de-clutching device (again not shown) is provided to allow the platform to be moved in a downward can begin to drive the assembly in a downward direction. after the page 66 has been scanned.

Although not shown, stop means is provided at the bottom of the travel to arrest the movement of the motor and downward movement of the sleeve 74 before bottoming.

In order to provide a degree of shock absorbing, the ring 26 may be carried by rubber bushes at 77 and 79.

Figure 2:
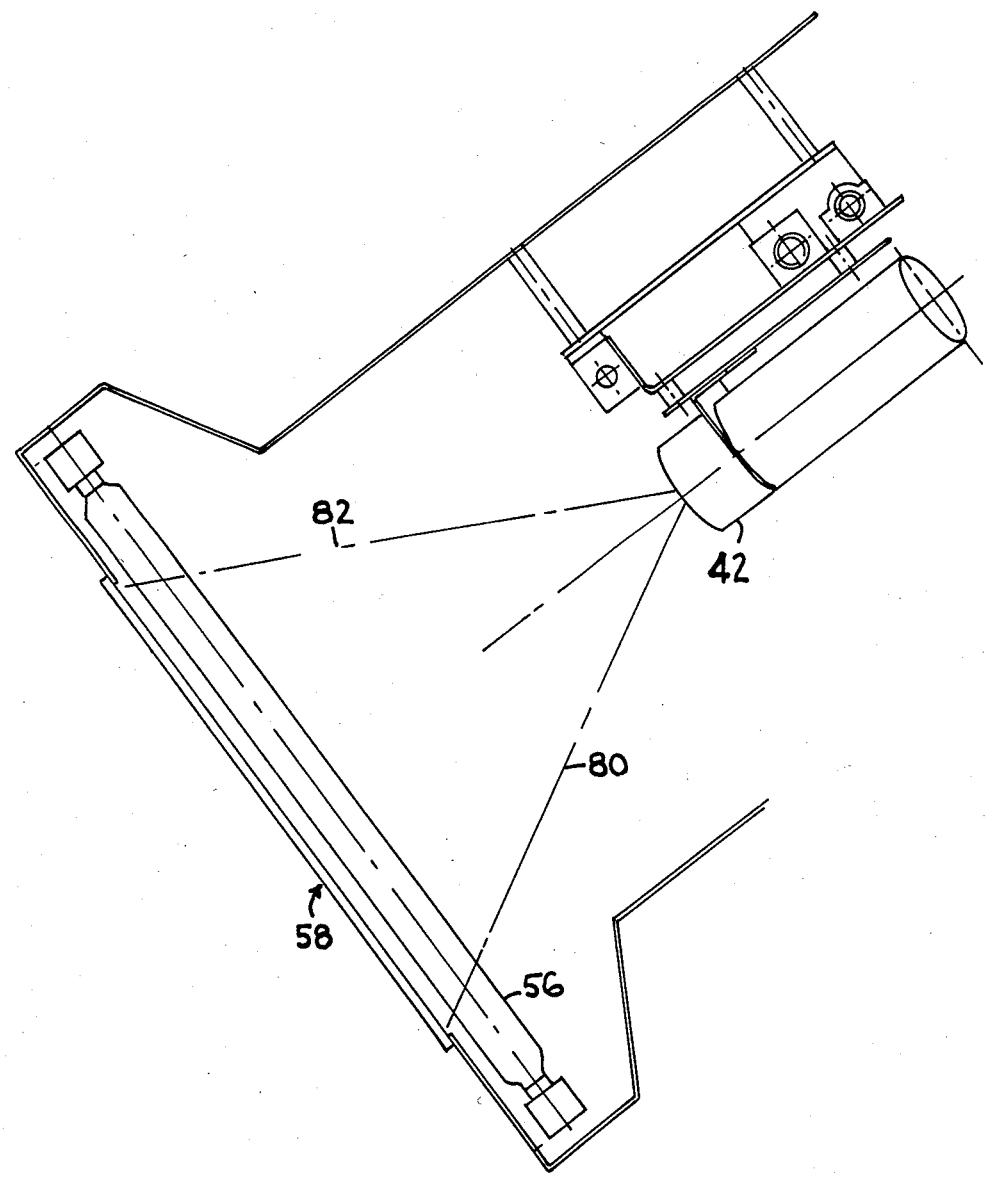
FIG. 2 is a plan view of part of the scanner housing of FIG. 1.

FIG. 2 is a cross-section through the housing 40 viewed from above and shows the window 58 in relation to the elongate lamp 56 previously shown in FIG. 1. In addition the field of view of the detector 42 is demonstrated by the diverging lines 80 and 82. To this end the divergence is intended to accommodate the full width of the window 58 and the movement of the scanner 42 along guide rails 46 and 50 is intended to cover the perpendicular dimension of the window 58.

Figure 3:
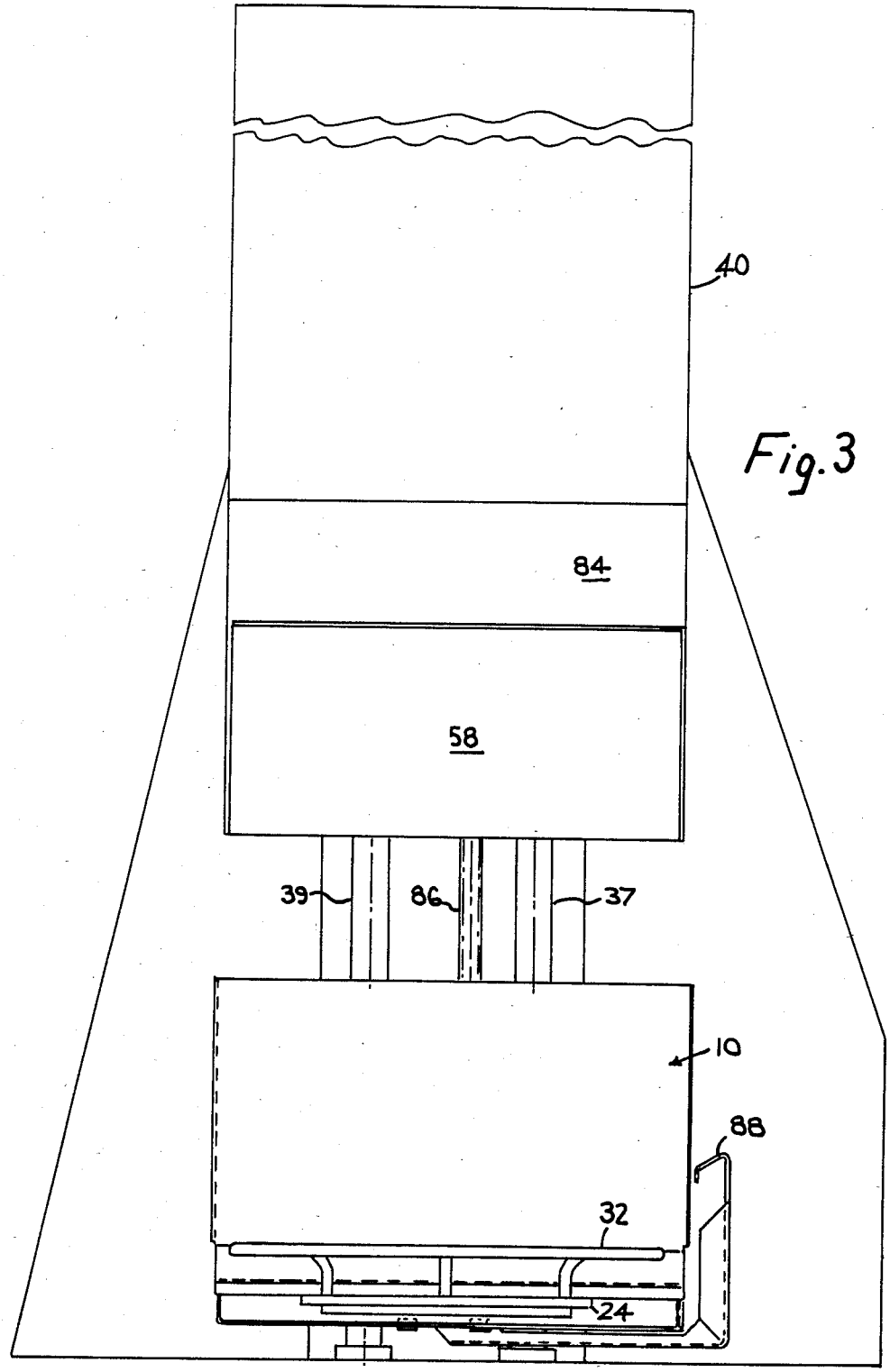
FIG. 3 is an end elevation of the unit shown in FIG. 1.

FIG. 3 which is an end elevation of the equipment shown in FIG. 1, illustrates the extent of the window 58 in the lower inclined face 84 of the housing 40.

The left hand side of the book support 10 can clearly be seen in FIG. 3 as also can the handwheel section 32 attached to the upper ring 24.

As is clearly seen in FIG. 3, the column 37 is one of a pair the other being denoted by reference numeral 39 and drive to the lifting platform 27 is achieved through rotating screw 86 located between and parallel to the two columns 37 and 39.

By using two columns any tendency of the book support assembly to twist about the axis of the screw threaded drive 86 wil be prevented.

FIG. 3 also shows the handle 88 (also shown in FIG. 1) which extends laterally from the sleeve 74 and can be used by the opertor to raise and lower the support manually during the last part of the travel.

Although not shown a modified document scanner may be constructed from components such as are shown in FIGS. 1 to 3 but excluding the elongate lamp 56. In such a modified scanner light from a document which may be a transparent film such as a microfiche, is directed through the window 58 and focussed using the aforementioned lens or additional lens means (not shown) onto the linear array of photoconductive junctions (not shown). Scanning and production of the video signal is then performed as beforementioned.

Figure 4:
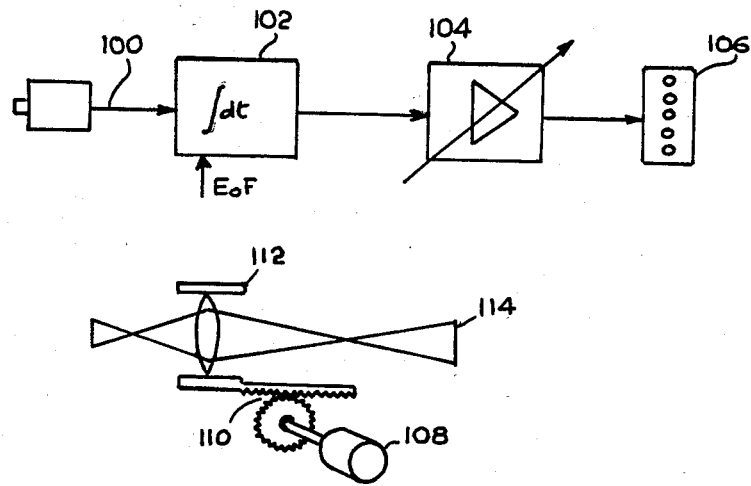
FIG. 4 is a block schematic circuit diagram of a focus indicating system embodying the invention.

FIG. 4 is a block schematic circuit diagram. Signals from the camera 42 are supplied along a signal path 100 to a signal integrating circuit 102 the output of which will vary with the focus of the image seen by the camera 42 and also from one document to the next. However the value of the integrated signal will be substantially proportional to the goodness of the focus of the image for any given document. The output signal is amplified by an amplifier 104 and supplied to a circuit means 105 which provides the actuating current to an LED strip indicator 106. Alarm means 107 may be provided for indicating if the focus signal amplitude drops below a given value.

Focus of the image supplied to the camera is adjusted by a control 108 which drives via a toothed drive 110 a lens 112 which controls the focus of the image 114.

Operation of the control 108 alters the focus. As it is improved so the number of lamps which are illuminated will increase. If it worsens, this and will appear as either an increase or a decrease in the number of light emitting diodes which are illuminated. The greater the number the better is the focus given static picture content.

If the phase of the integrated signal is changed so as to be opposite, (i.e. the smaller the signals the better the focus) the control 108 must be adjusted so as to reduce the number of lamps, which are illuminated, to the minimum.

It will be noted that amplifier 104 is shown as having a variable gain control. The variable gain control will allow the mean gain control to be set to just the right level for the primary feature content of the image. If the latter is high only a low mean level of amplification gain will be required. A lower level of picture content will require a higher mean amplification value to compensate.

Figure 5:
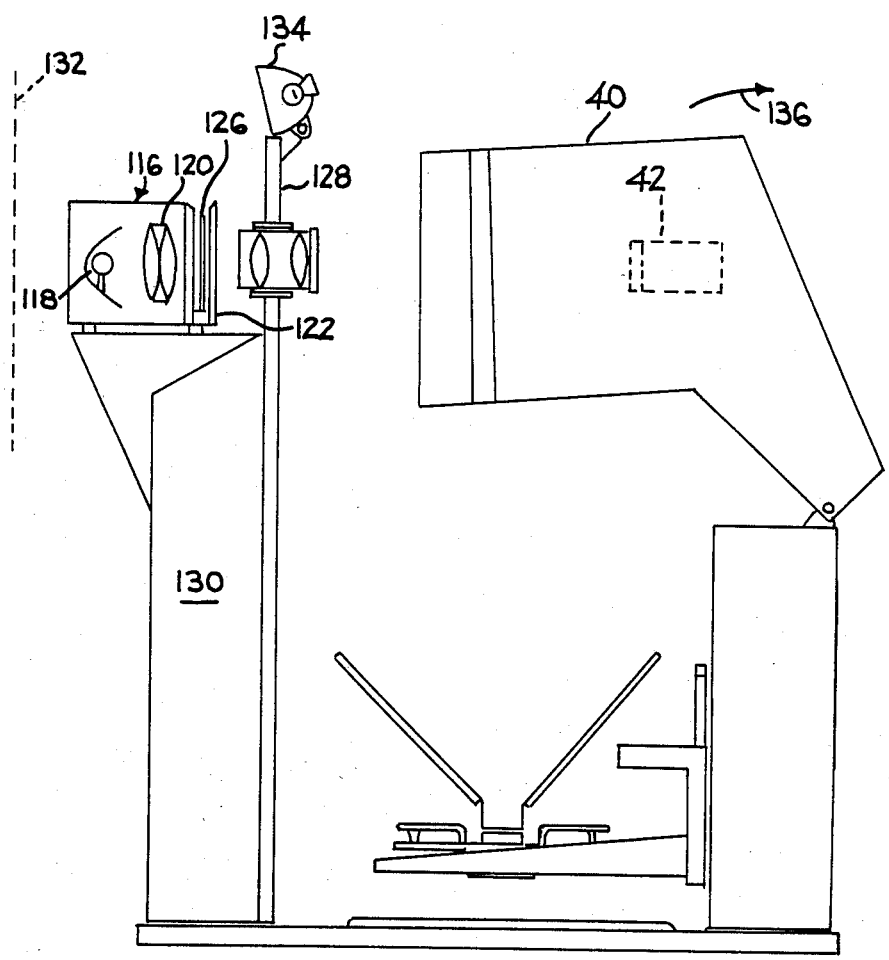
FIG. 5 shows how the scanner can cooperate with different imaging devices.

The housing 40 containing the detector 42 may itself be hinged with respect to platform 44 so as to allow it to be pivoted into a range of positions to accommodate different docuemnts and/or image forming optical systems, as shown in FIG. 5.

In FIG. 5 the housing 40 is shown tilted to a horizontal position and a projection device 116 is shown mounted on or adjacent to the housing 40 comprising a lamp 118, a condenser 120 and film holder 122 for transparencies or micro fiche or the like 126.

A focussing lens 124 is adjustable to form an in focus image of film or other device 126 onto the line of photosensitive elements (not shown) in the camera tube or scanner 42.

The projection device 116 may be removed to leave only the lens 124 and its related supports 128 and 130, to enable, with an appropriate focal length lens, 124, the large document such as a picture or map shown dotted at 132 to be focussed onto the camera 42.

A lamp 134 may be mounted on the support 130 to illuminate a document such as at 132.

Although not shown the housing 40 may be rotated further in the direction of arrow 136 until the window face 58 faces upwards and is substantially horizontal to allow for imaging from above.

A further refinement not previously mentioned may be incorporated so as to ensure sympathetic nestling of a book against the window 58 however the book has been opened, by providing for free sliding movement of the trough 10, 12 relative to the support platform 27 in the direction towards and away from the support column 37, so as to allow a book gutter to self-center relative to the vertex 60.

We claim:

1. A device for indicating the state of focus of an image of a document which is to be converted into a video signal by sequentially inspecting the incident light level of points within the image and generating an electrical signal having a parameter which varies with the light level, comprising:
   (a) means whereby the incident light level of points within the image is sequentially inspected to generate an electrical signal whose amplitude varies with the light level at the inspected points;
   (b) circuit means responsive to the electrical signal from the sequential inspection means for integrating the amplitude variations thereof to produce a varying amplitude focus indication signal;
   (c) amplifying means for generating from the varying amplitude signal a varying control signal;
   (d) an indicator comprising a linear array of a plurality of lamps;
   (e) circuit means which provides operating current for the lamps corresponding to the amplitude of the focus indication signal, so that the number of lamps sequentially illuminated corresponds in a predetermined relationshp with respect to the focus indication signal;
   (f) means for adjusting the focus of the image in response to visual inspection of the illuminated lamps, so as to obtain the best possible indication of the state of focus of the image.

2. A device as claimed in claim 1 in combination with a scanning device comprising a linear array of photoconductors which are electrically scanned to produce the video signal.

3. A device as claimed in claim 1 in which alarm means is provided together with circuit means associated therewith for indicating if the focus signal amplitude drops below a given value, during the scanning of the image.

4. A device as claimed in claim 1 in which the lamps are light emitting diodes (LED's) and comprise a so-called LED strip indicator.

5. A device as claimed in claim 1 in which the integration of the video signal by the first mentioned circuit means is over each line scan of the image so that the focus indicator signal will respond to any change in focus in the image.

6. The invention as defined in claim 1, wherein said operating current circuit means comprises means for generating an operating current directly proportional to said focus indication signal, whereby the number of lamps illuminated increases as said focus indication signal increases.

7. The invention as defined in claim 1, wherein said operating current circuit means comprises means for generating an operating current inversely proportional to said focus indication signal, whereby the number of lamps illuminated decreases as said focus signal increases.

* * * * *